United States Patent
Aykac et al.

(10) Patent No.: US 12,290,966 B2
(45) Date of Patent: May 6, 2025

(54) COMPOSITE LAY-UP MOLD PRODUCTION SYSTEM

(71) Applicant: TUSAS-TURK HAVACILIK VE UZAY SANAYII ANONIM SIRKETI, Ankara (TR)

(72) Inventors: Busra Aykac, Ankara (TR); Remzi Ecmel Ece, Ankara (TR); Yahya Oz, Ankara (TR); Metehan Erdogan, Ankara (TR); Ishak Karakaya, Ankara (TR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 209 days.

(21) Appl. No.: 18/014,916

(22) PCT Filed: Mar. 31, 2021

(86) PCT No.: PCT/TR2021/050291
§ 371 (c)(1),
(2) Date: Jan. 6, 2023

(87) PCT Pub. No.: WO2022/010431
PCT Pub. Date: Jan. 13, 2022

(65) Prior Publication Data
US 2024/0009895 A1    Jan. 11, 2024

(30) Foreign Application Priority Data
Jul. 8, 2020    (TR) .................... 2020/10823

(51) Int. Cl.
*B29C 33/56* (2006.01)
*B29C 70/30* (2006.01)

(52) U.S. Cl.
CPC ............. *B29C 33/56* (2013.01); *B29C 70/30* (2013.01); *B29K 2905/08* (2013.01)

(58) Field of Classification Search
CPC ...... B29C 33/56; B29C 70/30; B29K 2905/08
See application file for complete search history.

(56) References Cited

U.S. PATENT DOCUMENTS

| | | |
|---|---|---|
| 2,702,253 A | 2/1955 | Bergstrom et al. |
| 3,561,995 A | 2/1971 | Wu et al. |

(Continued)

FOREIGN PATENT DOCUMENTS

| | | |
|---|---|---|
| JP | 2016043507 A | 4/2016 |
| JP | 2016055459 A | 4/2016 |

(Continued)

OTHER PUBLICATIONS

International Search Report and Written Opinion for PCT application No. PCT/TR2021/050291, mailed Aug. 2, 2021.

(Continued)

*Primary Examiner* — James Sanders
(74) *Attorney, Agent, or Firm* — Notaro, Michalos & Zaccaria P.C.

(57) ABSTRACT

A mandrel is disclosed which is suitable for use in surface metallization process (electrodeposition) by electrolysis. The mandrel has at least one inner coating which is metallized on an outer surface of the mandrel by electrolysis method such that it almost entirely covers the outer surface thereof, allowing electrical conductivity to be created on the surface and at least one outer coating which is obtained by almost entirely an electrolytic and/or electroless metallization on the inner coating.

5 Claims, 2 Drawing Sheets

(56) References Cited

U.S. PATENT DOCUMENTS

| | | |
|---|---|---|
| 6,630,876 B1 | 10/2003 | Noyes et al. |
| 8,394,473 B2 | 3/2013 | McCrea et al. |
| 2003/0233960 A1 | 12/2003 | Grunwald |
| 2020/0086589 A1 | 3/2020 | Sekine et al. |
| 2020/0198185 A1 | 6/2020 | Hirabayashi et al. |

FOREIGN PATENT DOCUMENTS

| | | |
|---|---|---|
| JP | 2020044675 A | 3/2020 |
| WO | 2009001976 A1 | 12/2008 |
| WO | 2019049411 A1 | 3/2019 |

OTHER PUBLICATIONS

International Preliminary Report on Patentability, completed Aug. 30, 2022.
International Application Status Report generated Dec. 6, 2022.
Written Opinion of the International Preliminary Examining Authority dated Jun. 9, 2022.
Response to Written Opinion of the International Preliminary Examining Authority dated Aug. 2, 2022.
Demand/Request for Preliminary Examination dated Apr. 28, 2022.

COMPOSITE LAY-UP MOLD PRODUCTION SYSTEM

The present invention relates to a composite lay-up mold production system for allowing composite parts to be formed.

Composite production is a type of material that is used extensively in aviation and defense industry all across the world. Composite materials have properties such as high specific strength, corrosion resistance, low thermal expansion coefficient and high fatigue strength, which makes it a preferred type of material for aviation. For the production of composite materials, spraying, continuous molding, filament winding, resin transfer molding (RTM), sheet molding/compression molding and hand lay-up methods are used. Currently, hand lay-up method is generally used in the production of aviation structures. Resin-impregnated prepregs, which are reinforced with reinforcement materials such as carbon fiber and glass fiber by hand lay-up method, are laid on composite lay-up molds, and after a vacuuming process, they are autoclaved for curing. Composite lay-up molds are exposed to high pressures and temperatures. For that reason, the biggest problem in lay-up molds is thermal expansion. In the current state of the art, nickel molds are produced by electroforming method or PVD (Physical Vapor Deposition) method for parts with complex geometries. Electroforming method is preferred because it is a cost-effective method and provides ease of production and low device costs compared to PVD (Physical Vapor Deposition). Considering all these advantages and disadvantages, while selecting the mandrel material to be used for complex and large-sized parts, use of stainless-steel causes extra costs. Therefore, polymer-based mandrel materials are preferred. Electroforming process is carried out by performing a coating process on the mandrel.

In the U.S. Pat. No. 8,394,473, which is included in the known-state of the art, electroplating of metals such as Al, Ag, Au, Co, Ni, Pd, Sn on a polymer substrate is disclosed. The purpose of the coating is to provide vacuum resistance and fluid sealing for the metallized structure. The coating also provides abrasion resistance and repair benefits on the surface of the polymer structure. Usage of the coating to remain on the surface is disclosed.

In the U.S. Pat. No. 2,702,253, which is included in the known-state of the art, surface metallization is disclosed. Metals such as Pd, Ni, Cr, Al in an electrolytic solution are enabled to be coated on any surface by means of redox reactions from the solution containing SnCl. A method for a surface metallization coating is disclosed.

In the U.S. Pat. No. 3,561,995A, which is included in the known-state of the art, a method for electrically activating a polymer surface is described. In the method, it is disclosed that a surface of a polymer material is activated so that it is provided with a threshold conductivity level suitable for metal deposition. The activation process is enabled by bringing the polymer surface in contact with an activation liquid composition. The composition comprises at least one reactive conditioning agent selected from an acidic substance, salts of the acidic substance, a metal hydroxide, metal oxide or an oxygen-containing organic substance and ion of a metal selected from the group consisting of platinum, palladium, silver, gold, iron, nickel, cobalt, copper and rhodium. It is disclosed that the polymer material to be metallized by activation can be polyurethane, and the material can be coated with Nickel at the end of the process.

In the U.S. patent application Ser. No. US20030233960A1, which is included in the known-state of the art, a method for subjecting the polyurethane to a surface treatment for coating is disclosed. In the method, the polyurethane surface is first exposed to one of a certain ultraviolet radiation sensitizer and then exposed to intense ultraviolet radiation and a more electroless coating process, so that it can be coated by an electrolysis method. The surface obtained can then be electrolytically coated with copper, nickel, silver or any other desired metal.

With the composite lay-up mold production system developed with the present invention, a fast, cost-effective, industrially applicable, efficient and durable composite lay-up mold production is achieved.

An object of the invention is to produce a low-cost composite lay-up mold by electroforming method.

Another object of the invention is to obtain composite lay-up molds resistant to high temperature and pressure.

A further object of the invention is to produce the molds used in the production of composite parts with complex geometry by an easy and fast process.

The composite lay-up mold production system realized to achieve the object of the invention and defined in the first claim and the claims dependent thereon comprises a mandrel whose surface is suitable for coating by electroforming process; at least one inner coating which is coated on an outer surface of the mandrel so as to increase the electrical conductivity on the mandrel, and is coated by metallization method such that it completely covers the outer surface; at least one outer coating which is coated by electroless coating and/or electroforming on an uncoated surface of the inner coating.

The composite lay-up mold production system of the invention comprises a composite lay-up mold which is used for obtaining a pre-form of a fabric and consists of the inner coating and the outer coating with the removal of the inner coating and the outer coating from the surface of the mandrel as an adjacent single piece.

In an embodiment of the invention, the composite lay-up mold production system comprises a part formed by curing the fabric, which has been pre-formed by the composite lay-up mold, under the effect of temperature and pressure in a furnace.

In an embodiment of the invention, the composite lay-up mold production system comprises a composite lay-up mold which allows part production with a hand lay-up method (prepreg).

In an embodiment of the invention, the composite lay-up mold production system comprises a mandrel which is made of high-density polyurethane foam material with a pore diameter between 1-2 µm, and has a form-fitting geometric shape with the part.

In an embodiment of the invention, the composite lay-up mold production system comprises a mandrel made of high-density polyurethane foam material having a structure for which conductivity can be increased by doping with graphene, CNT (carbon nanotube), black carbon or carbon derivatives.

In an embodiment of the invention, the composite lay-up mold production system comprises a mandrel which has a threshold value for electrical conductivity required for the inner coating to be coated on the mandrel surface.

In an embodiment of the invention, the composite lay-up mold production system comprises a mandrel whose surface is cleaned with alkaline solutions and etched with sulfuric acid in order to create a porous structure on its surface.

In an embodiment of the invention, the composite lay-up mold production system comprises an inner coating which is coated on the mandrel surface so as to increase surface conductivity thereof, wherein the mandrel immersed in a solution containing $Sn^{+2}$ ions is sensitized by deposition of $Sn^{+2}$ ions to the pores on the surface of the mandrel, and then, the mandrel is immersed in an activation solution containing $Pd^{+2}$ ions such that $Sn^{+2}$ ions in the pores are oxidized to $Sn^{+4}$ ions and $Pd^{+2}$ ions are reduced to Pd atom.

In an embodiment of the invention, the composite lay-up mold production system comprises an outer coating obtained by an electrolysis method by coating the mandrel surface with nickel and/or nickel alloy by electrolytic and/or electroless metallization method such that it covers the mandrel.

The composite lay-up mold production system realized to achieve the object of the present invention is illustrated in the attached drawings, in which.

Figure 1:
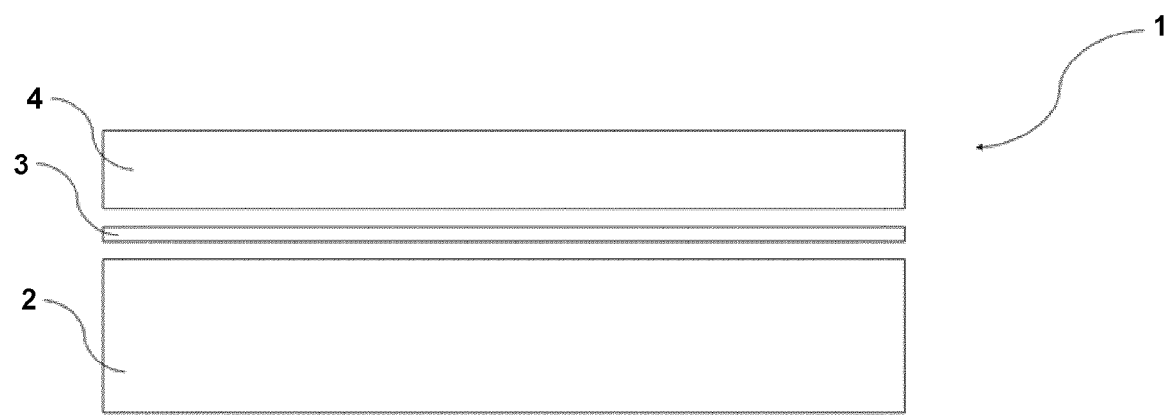
FIG. 1 is a schematic view of the composite lay-up mold production system.

All the parts illustrated in figures are individually assigned a reference numeral and the corresponding terms of these numbers are listed below:
1. Composite lay-up mold production system
2. Mandrel
3. Inner coating
4. Outer coating
5. Composite lay-up mold
k. Fabric
p. Part The composite lay-up mold production system (1) comprises a mandrel (2) suitable for use in electrodeposition process by electrolysis; at least one inner coating (3) which is metallized on an outer surface of the mandrel (2) by electrolysis method such that it almost entirely covers the outer surface thereof, allowing electrical conductivity to be created on the surface; at least one outer coating (4) which is obtained almost entirely by an electrolytic and/or electroless metal coating on the inner coating (3) (FIG. 1).

Figure 3:
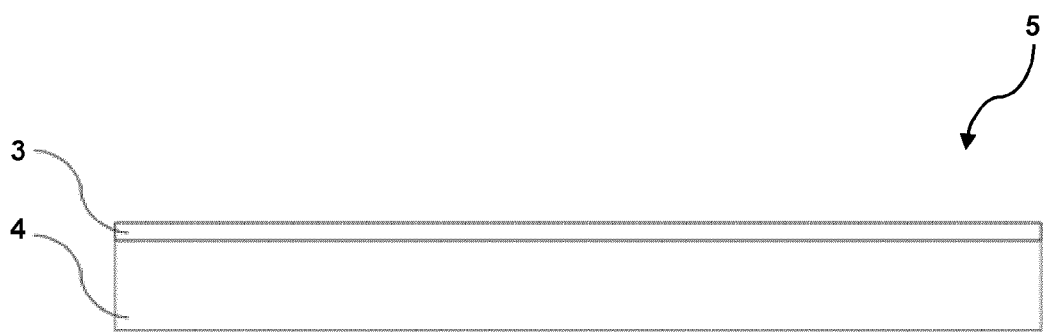
FIG. 3 is a schematic view of the composite lay-up mold.

The composite lay-up mold production system (1) of the invention comprises a composite lay-up mold (5) which allows a fabric (k) laid thereon to be pre-formed, consists of the inner coating (3) and the outer coating (4), and is obtained by the removal of the inner coating (3) and the outer coating (4) from the mandrel (2) almost entirely as a single piece (FIG. 3).

In order for the composite part (p) to take the shape predetermined by the user, there are provided a mandrel (2) that fits into that shape and whose surface conductivity is suitable for metallization (electroplating) process, at least one inner coating (3) which is obtained by coating metal ions predetermined by the user, by the electroplating process, from a solution in order to provide surface conductivity on the surface of the mandrel (2) such that they almost entirely cover the outer surface of the mandrel (2), at least one outer coating (4) which takes the shape of the inner coating (3) by being coated on an outer surface of the inner coating (3) by electrolytic and/or electroless metallization method such that it almost entirely covers the surface thereof (FIG. 1).

A composite lay-up mold (5) production is provided, which is obtained by removal of the inner coating (3) and the outer coating (4) from the surface of the mandrel (2) as one piece, consists of both the inner coating (3) and the outer coating (4), and preforms the fabric (k) when the fabric (k) is laid thereon. In this way, molds resistant to expansion with high pressure and temperature can be produced with an effective and easy method (FIG. 3).

Figure 2:
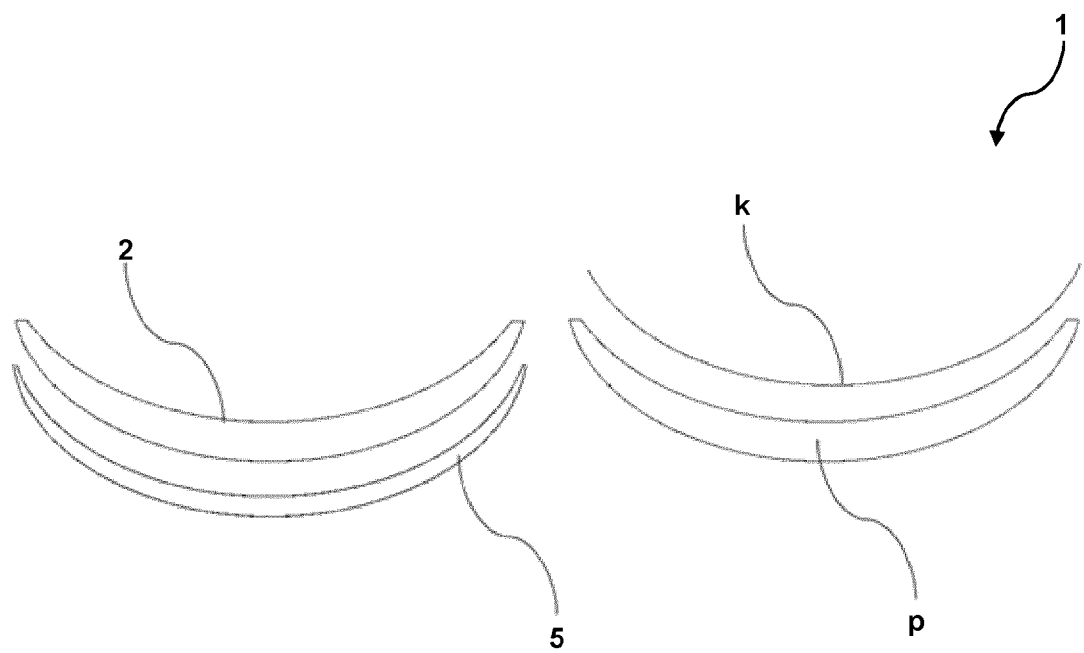
FIG. 2 is a sectional view of the composite lay-up mold, the fabric and the mandrel.

In an embodiment of the invention, the composite lay-up mold production system (1) comprises a part (p) obtained by curing the fabric (k), which has been pre-formed by being laid on the composite laying mold (5), under temperature and pressure. In order to form the parts (p) made of composite material, the fabric (k) is pre-formed by laying it on the composite laying mold (5). The pre-formed fiber fabrics (k) are cured in a furnace to form the final form of the piece (p). In this way, part (p) made of a composite material can be produced effectively (FIG. 2).

In an embodiment of the invention, the composite lay-up mold production system (1) comprises a composite lay-up mold (5) used in a hand lay-up process for prepreg fabrics (k). In the production of the part (p) made of composite material, its fabrics (k) are produced by hand lay-up method. Thus, more efficient production of composite parts (p) is provided.

In an embodiment of the invention, the composite lay-up mold production system (1) comprises a mandrel (2) which is obtained from high-density polyurethane foam with a pore diameter varying between 1-2 µm, and has a form-fitting structure with the part (p). The mandrel (2) with high density, where the diameters of the pores vary between 1-2 µm, is used for the production of composite lay-up mold (5). Thus, it can be used as a cost-effective and robust substrate with higher electrical conductivity for electrolysis process, for which the conductivity can be increased.

In an embodiment of the invention, the composite lay-up mold production system (1) comprises a mandrel (2) made of high-density polyurethane foam material with a suitable structure to increase the conductivity by doping with black carbon and/or different derivatives of carbon, CNT (carbon nano tube) or graphene. In addition to having a high-density structure, a mandrel (2) which is made suitable for surface metal coating with electrolysis by increasing its conductivity by doping with carbon derivatives such as black carbon, CNT (carbon nanotube) or graphene is used. Thus, it is easily subjected to metal coating process by electrolysis and an efficient composite lay-up mold (5) is produced.

In an embodiment of the invention, the composite lay-up mold production system (1) comprises a mandrel (2) with a conductivity value above a threshold value that allows the inner coating (3) to be coated on the surface of the mandrel (2) with electrolysis. A mandrel (2) which has a surface with an electrical conductivity required to form the inner coating (3) is used. In this way, the inner coating (3) can be coated on the surface of the mandrel (2) in a cost-effective manner by providing an effective coating with electrolysis.

In an embodiment of the invention, the composite lay-up mold production system (1) comprises a mandrel (2) on which surface cleaning can be performed with alkaline solutions, wherein a porous structure can be formed on the surface of the mandrel (2) by surface treatment with sulfuric acid. The porous structure (surface roughness) required for the formation of the inner coating (3) on the surface of the mandrel (2) is formed on purpose by the surface treatment using sulfuric acid after the cleaning process with alkali solutions on the surface of the mandrel (2). Thus, the inner coating (3) can be adsorbed on the surface of the mandrel (2) in a more cost-effective manner.

In an embodiment of the invention, the composite lay-up mold production system (1) comprises an inner coating (3) which is coated on the mandrel (2) surface such that it provides an increase in the surface conductivity thereof, wherein the mandrel (2) immersed in a solution containing $Sn^{+2}$ ions is sensitized by deposition of $Sn^{+2}$ ions to the pores on the surface on the mandrel (2), and the mandrel (2), whose surface has been sensitized, is immersed in an activation solution containing $Pd^{+2}$ ions such that $Sn^{+2}$ ions in the pores are oxidized to $Sn^{+4}$ ions and $Pd^{+2}$ ions are reduced to Pd atom. After the sensitization process of the mandrel (2) by exposing it to a solution containing $Sn^{+2}$ ions and filling the pores opened on its surface, the mandrel (2) is immersed in an activation solution containing $Pd^{+2}$ ions, $Sn^{+2}$ ions in the pores are oxidized to $Sn^{+4}$ ions and the $Pd^{+2}$ ions are reduced to Pd atom, so that the surface of the mandrel (2) is coated by the inner coating (3) which increases the surface conductivity. Thus, the outer coating (4), which is a part of the coating composite lay-up mold (5), will be allowed to take the shape of the mandrel (2).

In an embodiment of the invention, the composite lay-up mold production system (1) comprises an outer coating (4) which is obtained by almost entirely coating the nickel and/or nickel alloy on the inner coating (3) by electroless metallization and/or electrolytic electroforming method. The outer coating (4) is obtained by coating the nickel and/or nickel alloys, which are required to obtain the composite lay-up mold (5) and predetermined by the user, on the inner coating (3) with an electroless and/or electrolytic method, Thus, the composite lay-up mold (5) is effectively produced.

The invention claimed is:

1. A composite lay-up production system (1) comprising:
   a mandrel (2) suitable for use in an electrodeposition process by electrolysis;
   at least one inner coating (3) which is metallized on an outer surface of the mandrel (2) by an electrolysis method such that it almost entirely covers the outer surface thereof, allowing electrical conductivity to be created on the surface;
   at least one outer coating (4) which is obtained by an electrolytic or electroless metal coating on the inner coating (3), wherein the mandrel (2) is produced from high density polyurethane foam material and is suitable for increasing its conductivity by doping with black carbon and/or different derivatives of carbon, CNT (carbon nano tube) or graphene;
   wherein the inner coating (3) is formed on the surface of said mandrel (2) by first immersing said mandrel (2) in a solution containing $Sn^{+2}$ ions so that $Sn^{+2}$ ions are deposited to pores on the surface of the mandrel (2), and then immersing said mandrel (2) in an activation solution containing $Pd^{+2}$ ions so that the $Sn^{+2}$ ions in the pores of said mandrel (2) are oxidized to $Sn^{+4}$ and the $Pd^{+2}$ ions are reduced to Pd atoms, providing an increase in surface conductivity; and
   a composite lay-up mold (5) which allows a fabric (k) laid thereon to be pre-formed, consists of the inner coating (3) and the outer coating (4), and is obtained by the removal of the inner coating (3) and the outer coating (4) from the mandrel (2) as a single piece.

2. A composite lay-up production system (1) according to claim 1, configured to apply a curing method under temperature and pressure to the pre-shaped fabric (k) laying on the composite laying mold (5) to produce a part (p).

3. A composite lay-up production system (1) according to claim 1, wherein the composite lay-up mold (5) is suitable for use in a hand lay-up process for prepreg fabrics (k).

4. A composite lay-up production system (1) according to claim 1, wherein the mandrel (2) has a conductivity value above a threshold value, allowing the inner coating (3) to be coated on the surface of the mandrel (2) with electrolysis.

5. A composite lay-up production system (1) according claim 1, wherein the outer coating (4) is obtained by coating nickel and/or nickel alloy on said inner coating (3) by an electroless metallization or electrolytic electroforming method.

* * * * *